US008417453B2

(12) United States Patent
Masuda et al.

(10) Patent No.: US 8,417,453 B2
(45) Date of Patent: Apr. 9, 2013

(54) MAP INFORMATION GUIDANCE DEVICE, MAP INFORMATION GUIDANCE METHOD, AND COMPUTER PROGRAM

(75) Inventors: Yoshitaka Masuda, Okazaki (JP); Kentaro Yanagi, Gifu (JP)

(73) Assignee: Aisin AW Co., Ltd., Anjo (JP)

( * ) Notice: Subject to any disclaimer, the term of this patent is extended or adjusted under 35 U.S.C. 154(b) by 209 days.

(21) Appl. No.: 12/842,313

(22) Filed: Jul. 23, 2010

(65) Prior Publication Data
US 2011/0282575 A1  Nov. 17, 2011

(30) Foreign Application Priority Data

Jul. 31, 2009  (JP) ................................. 2009-178699

(51) Int. Cl.
G01C 21/34 (2006.01)
G08G 1/123 (2006.01)

(52) U.S. Cl.
USPC ............ 701/533; 701/400; 701/532; 340/988

(58) Field of Classification Search .......... 701/400–431, 701/533; 340/988–995.28
See application file for complete search history.

(56) References Cited

U.S. PATENT DOCUMENTS

| 6,549,847 | B2 * | 4/2003 | Ikeuchi et al. ................ 701/410 |
| 6,594,580 | B1 * | 7/2003 | Tada et al. ..................... 701/532 |
| 6,636,805 | B1 * | 10/2003 | Tada et al. ..................... 701/420 |
| 6,691,028 | B2 * | 2/2004 | Bullock et al. ................. 701/420 |
| 7,317,986 | B2 * | 1/2008 | Kim ............................... 701/410 |
| 7,339,496 | B2 * | 3/2008 | Endo et al. ................ 340/995.12 |
| 7,769,541 | B2 * | 8/2010 | Watanabe ...................... 701/450 |
| 8,175,802 | B2 * | 5/2012 | Forstall et al. ................ 701/424 |
| 8,275,352 | B2 * | 9/2012 | Forstall et al. ............. 455/404.2 |
| 2008/0208452 | A1 | 8/2008 | Stocker |

FOREIGN PATENT DOCUMENTS

JP  A 2004-085245  3/2004

OTHER PUBLICATIONS

Apr. 27, 2011 European Search Report issued in EP 10 17 0627.

* cited by examiner

Primary Examiner — Thomas Tarcza
Assistant Examiner — Tyler J Lee
(74) Attorney, Agent, or Firm — Oliff & Berridge, PLC

(57) ABSTRACT

Devices, methods, and programs update map information stored in a storage medium based on map update information distributed from a map distribution center. The devices, methods, and programs search for a vehicle route based on the stored map information, perform first guidance along the route, and identify a target area on the route that will be updated when the map information is updated. The devices, methods and programs determine whether the update of the target area will be complete when the vehicle reaches the target area. If the update of the target area will not be complete when the vehicle reaches the target area, the devices, methods, and programs request second guidance for the target area from the map distribution center, switch from proving the first guidance to providing the second guidance through the target area, and return to performing the first guidance when the vehicle exits the target area.

20 Claims, 8 Drawing Sheets

MAP INFORMATION GUIDANCE DEVICE, MAP INFORMATION GUIDANCE METHOD, AND COMPUTER PROGRAM

INCORPORATION BY REFERENCE

The disclosure of Japanese Patent Application No. 2009-178699, filed on Jul. 31, 2009, including the specification, drawings, and abstract is incorporated herein by reference in its entirety.

BACKGROUND

1. Related Technical Fields

Related technical fields include map information guidance devices, map information guidance methods, and computer programs which perform map guidance.

2. Related Art

Recently, navigation devices that perform vehicle travel guidance so that a driver can reach a desired destination easily are often installed in vehicles. Here, a navigation device is a device which is capable of detecting the current position of a vehicle using a GPS receiver or the like, obtaining map information corresponding to the current position from a storage medium such as a DVD-ROM or an HDD, or through a network, and displaying the obtained map information on a liquid crystal monitor. The map information including the current position of the vehicle are read from the storage medium or the like, and on the basis of the map information, a map image of the periphery of the current vehicle position is drawn and displayed on a display device. At the same time, a vehicle position mark is superposed on the map image, and as the vehicle moves, the map image is scrolled, or the map image is fixed on the screen and the vehicle position mark is moved. Thus, the current location of the vehicle can be learned at a glance. In recent years, cellular telephones, personal digital assistants (PDAs), personal computers and the like often have a function similar to the navigation device above.

Throughout Japan, new roads are constructed every year. At the same time, existing roads are destroyed and the shape of existing roads is modified. In this case, a problem arises in that information relating to new roads and the like constructed after the map information of the navigation device or the like have been generated is not recorded in the map information. In other words, in a navigation device or the like storing map information that does not include new roads and the like, the new roads are not displayed on the liquid crystal monitor, and since the new roads are not included in route searches, the navigation device finds recommended routes that do not pass along the new roads. Consequently, it may not be possible to find the optimum route. To avoid this problem, the map information stored in the navigation device or the like must be updated at intervals of a certain time period. Here, map information updating is performed by purchasing a storage medium having new map information and replacing the old storage medium with the new storage medium, or overwriting the map information in the navigation device or the like on the basis of map information for updating (hereinafter referred to as map update information) that is distributed from a map distribution center or the like.

Here, the method of updating the map information in the navigation device or the like using the map update information distributed from the map distribution center is advantageous because it does not require a storage medium during the update operation, and map updating can be performed at an earlier timing. For example, Japanese Patent Application Publication No. JP-A-2004-85245 (pages 6 and 7, FIG. 3) describes art that confirms with a map distribution center whether there is a map information update for a guidance route when a route search to a destination is performed. If there is a map information update, map update information is acquired from the map distribution center and used to update the map information.

SUMMARY

With the art described in JP-A-2004-85245, map information that pertains to a road on which the vehicle is scheduled to travel can be updated more quickly to new map information, but the following problems remain. Specifically, the process for receiving map update information from the map distribution center and the process for updating map information often cannot be completed in a short time. Thus, the update process of map information for an update target area may not be completed before the vehicle reaches the update target area whose map information is to be updated. In such cases, guidance is consequently performed based on the pre-update map information.

Meanwhile, a so-called communication type navigation system is conventionally known as a technique for always performing guidance based on new map information instead of updating the map information in the navigation device, and performs map guidance based on guidance information the navigation device receives from the map distribution center. However, the volume of communication between the navigation device and the map distribution center significantly increases with such a communication type navigation system, and the response of the guidance process may worsen as a result.

Exemplary implementations of the broad inventive principles described herein provide a guidance device, a guidance method, and a guidance program that perform suitable guidance based on new map information and suppress a volume of communication between the map information guidance device and a map distribution center without worsening a response of a guidance process, by switching between a first guidance that uses map information stored in a map information storage medium and a second guidance that uses guidance information created by the map distribution center.

Exemplary implementations provide devices, methods, and programs that receive map update information distributed from a map distribution center and update map information stored in storage medium based on the received map update information. The devices, methods, and programs search for a vehicle route based on the stored map information, perform a first guidance along the route, and identify an update target area on the route that will be updated when the map information is updated. The devices, methods and programs determine whether the update of the update target area will be complete when the vehicle reaches the update target area. If the update of the update target area will not be complete when the vehicle reaches the update target area, the devices, methods, and programs request second guidance for the update target area from the map distribution center, switch from proving the first guidance to providing the second guidance through the update target area, and return to performing the first guidance when the vehicle exits the update target area.

DETAILED DESCRIPTION OF EXEMPLARY IMPLEMENTATIONS

A specific example of a map information guidance device that is realized in a navigation device 1 will be described in detail below with reference to the drawings.

Figure 1:
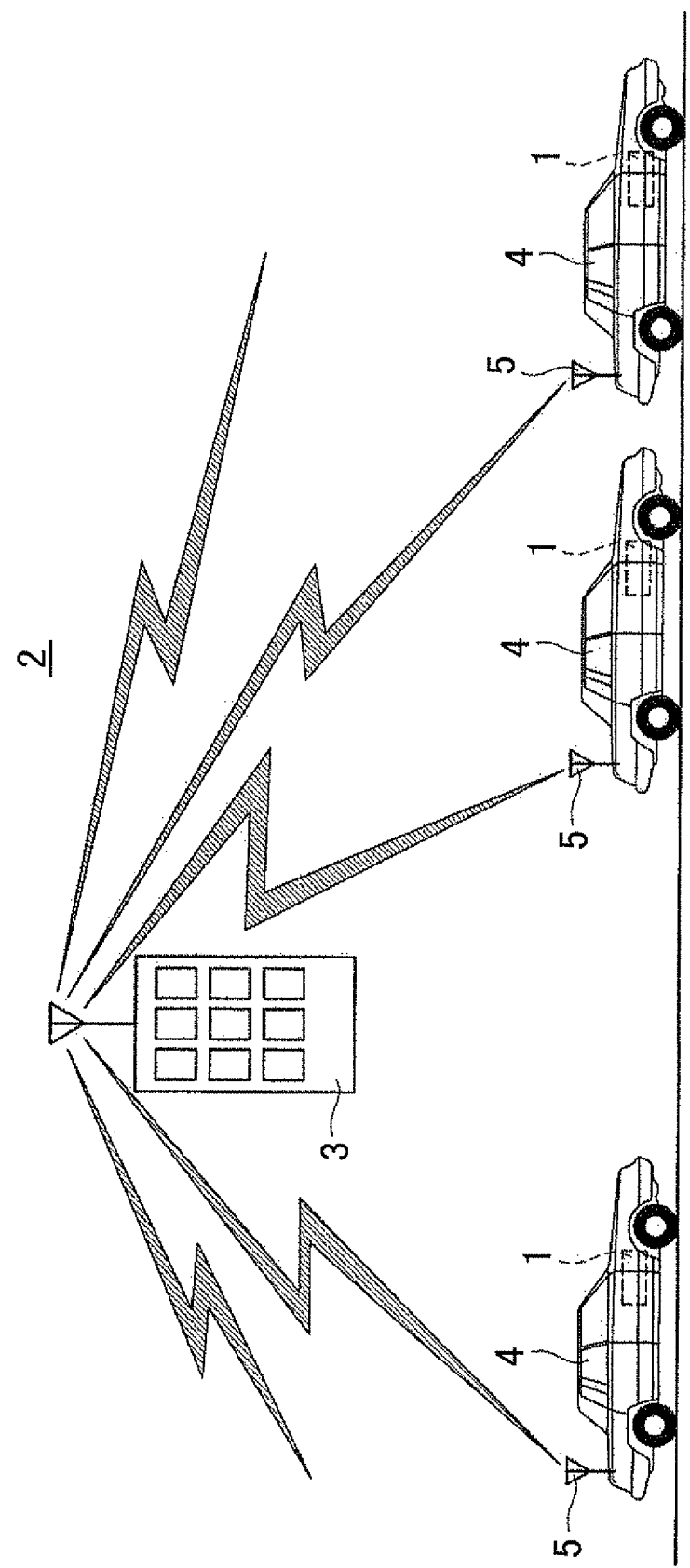
FIG. 1 is a schematic diagram that shows a map information distribution system according to an example.

First, an overall configuration of a map information distribution system 2 that includes the navigation device 1 according to the present example will be explained using FIG. 1. FIG. 1 is a schematic diagram that shows the map information distribution system 2 according to this example.

As shown in FIG. 1, the map information distribution system 2 according to the present example is basically constituted by a map distribution center 3, and a navigation device 1 installed in a vehicle 4. Note that an example according to this example uses the navigation device 1 as a terminal that stores map information described later, and updates the stored map information based on data distributed from the map distribution center 3. However, a cellular telephone, PDA, personal computer, or the like may be used in place of the navigation device 1.

Here, the map distribution center 3 generates data for updating an old version of map information stored in the navigation device 1 to a new version of the map information that incorporates newly constructed or eliminated roads, facilities, and the like (to be referred to hereafter as map update information), and distributes the generated map update information. Note that two types of map update information exist, namely full update data for overwriting and updating all of the map information stored in the navigation device 1 (to be referred to hereafter as a full update), and differential update data for overwriting and updating only a specific area of the map information (to be referred to hereafter as a differential update). In the example to be described below, only the differential update data is used as map update information.

The map distribution center 3 constitutes a so-called communication type navigation system together with the navigation device 1 under specific conditions. Here, the communication type navigation system is a system in which the navigation device 1 does not perform guidance using the map information stored in the navigation device 1, but rather acquires guidance information created in the map distribution center 3 through communication and performs guidance using the acquired guidance information.

Specifically, when guidance is performed using a communication type navigation system, request information for guidance information is transmitted from the navigation device 1 to the map distribution center 3. In response, the map distribution center 3 generates a guidance image and voice guidance to be output by the navigation device 1 as guidance information, and transmits the guidance information to the navigation device 1 that originated the initial transmission. The navigation device 1 then performs travel guidance by outputting the guidance image and voice guidance included in the received guidance information from a liquid crystal display 45 and a speaker 46.

The navigation device 1 is an on-vehicle device disposed in the vehicle 4, which travels roads throughout Japan, for displaying a map of the periphery of the vehicle position on the basis of the stored map information and the guidance information received from the map distribution center 3, and performing a route search and route guidance to a set destination. Here, the map distribution center 3 and the navigation device 1 are constituted to be capable of two-way communication using a vehicle communication module 5 (to be referred to hereafter simply as a communication module 5) such as a cellular telephone or DCM installed in the vehicle in advance. Thus, various types of information, such as distribution request data described later, map update information, guidance information request information, and guidance information, are transmitted and received between the map distribution center 3 and the navigation device 1.

When a specific condition is met (such as when the power is turned on, or a destination is set and route guidance started), the navigation device 1 transmits to the map distribution center 3 a distribution request for map update information in order to update the map information of a specific area (such as an 80-km$^2$ area centered on the user's home, or a 10-km$^2$ area centered on the set destination, or an area that includes a guidance route) to a new version of the map information.

When the navigation device 1 receives the map update information from the map distribution center 3 in response to the transmitted distribution request, the navigation device 1 updates the stored map information on the basis of the received map update information.

Figure 2:
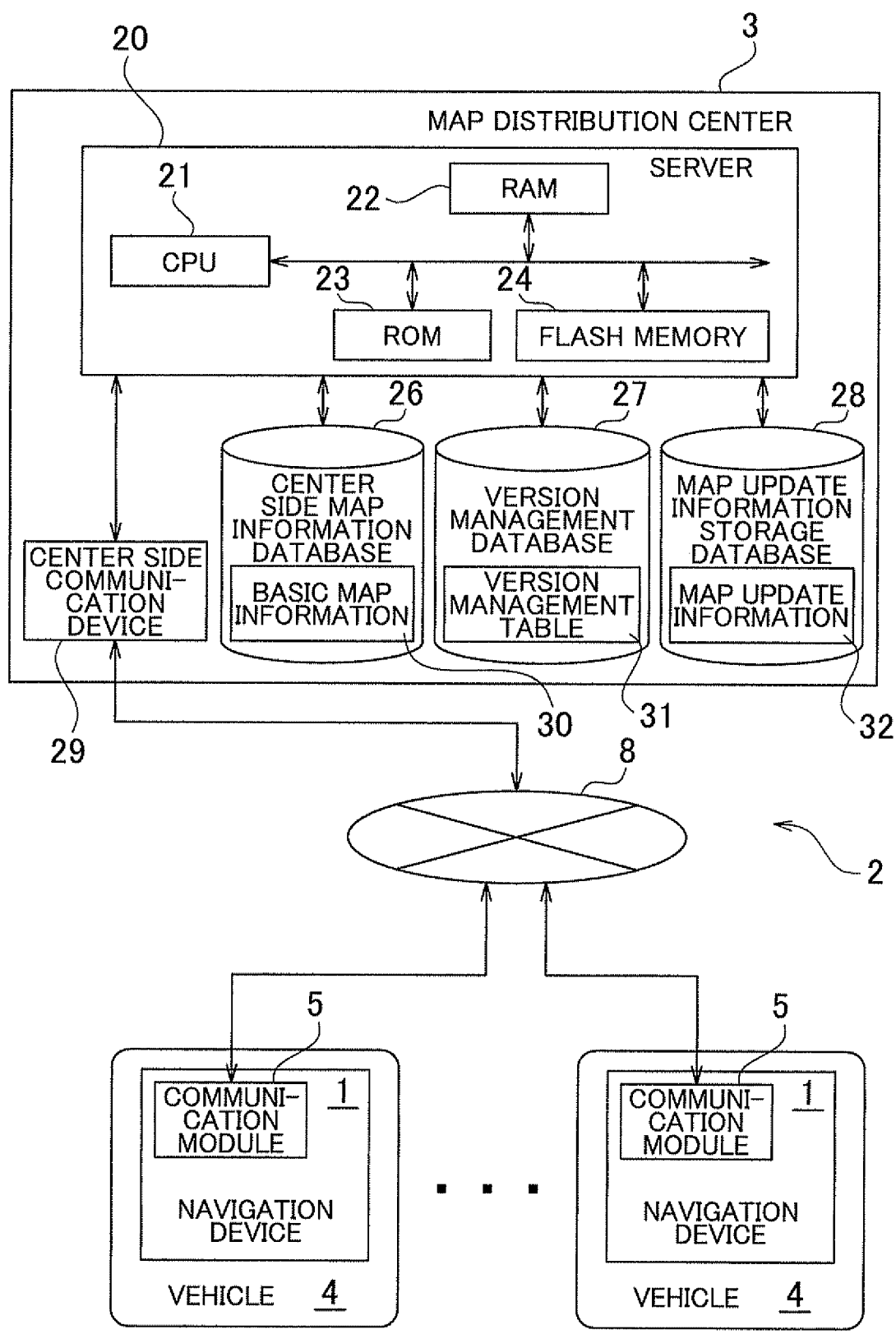
FIG. 2 is a block diagram that shows the structure of the map information distribution system according to the example.

Next, the map distribution center 3 of the map information distribution system 2 will be described in detail using FIG. 2. FIG. 2 is a block diagram that shows the structure of the map information distribution system 2 according to the present example.

As shown in FIG. 2, the map distribution center 3 includes a controller (e.g., server 20), a center side map information database 26 serving as an information recording portion connected to the server 20, a version management database 27, a map update information storage database 28, and a center side communication device 29.

The server 20 is a control unit that performs overall control of the map distribution center 3, including: a process for registering new map information that incorporates the addition or elimination of roads and facilities throughout the country on the basis of an administrator's input operation or the like; a process for generating map update information to be distributed to the navigation device 1; a process for distributing the generated map update information to the navigation device 1; a process for generating the guidance information; and a process for transmitting the generated guidance information to the navigation device 1. The server 20 has a CPU 21 serving as a computational device and a control device for performing overall control of the server 20, a RAM 22 which is used as a working memory when the CPU 21 performs various types of computational processing, a ROM 23 storing control programs as well as a guidance processing program described later (see FIGS. 6 and 7), and an internal storage device such as a flash memory 24 for storing programs read from the ROM 23.

The center side map information database 26 is a storage unit that stores, by version and by area, basic map information 30 that is map information added on the basis of input data or an input operation from the outside and serves as a basis for updating the map information stored in the navigation device 1. Here, a version is creation time information for specifying the time at which the map information is created. By referring to the version, the creation time of the map information can be specified.

The map distribution center 3 manages versions of the basic map information 30 stored in the center side map information database 26 in units of two-dimensional (2D) 10-km$^2$ meshes. Regarding the basic map information 30, when the administrator registers new map information, the version of the 2D meshes included in the registered new map information is newly updated (e.g. version 4 is updated to version 5). Note that in addition to the latest version of the basic map information 30, the old version of the basic map information 30 is also stored in the center side map information database 26 by version and by 2D mesh.

The version management database 27 is a storage unit that stores a version management table 31, which shows the map information version currently stored in each navigation device 1 subject to distribution of the map update information. Here, the map information and the basic map information 30 stored in the navigation device 1 include a road network and various types of information required for route guidance and map display, and are constituted by map display data for displaying a map, intersection data relating to intersections, node data relating to node points, link data relating to roads (links), search data for finding a route, facility data relating to facilities, search data for finding a geographical location, and so on, for example.

The map information distribution system 2 manages versions of the map information stored in the navigation device 1 in units of 10-km$^2$ 2D meshes for every navigation device 1 that is a destination for distribution. After distributing the map update information to the navigation device 1, the map distribution center 3 assumes that the navigation device 1, i.e., the distribution destination, performed map updating using the distributed map update information, and updates the version corresponding to the applicable user ID and mesh ID within the version management table 31.

The map update information storage database 28 is a storage unit that stores map update information 32 generated by the server 20 based on the basic map information 30 and the version management table 31 stored in the version management database 27.

Here, the map update information 32 is data that differentially updates the map information of an area as requested by the navigation device 1 (to be referred to hereafter as an update request area), among the map information stored in the navigation device 1, to a new version of the map information. In general, after the map distribution center 3 receives a distribution request for map update information from the navigation device 1, the map distribution center 3 generates the map update information to be distributed to the navigation device 1 that originated the distribution request and distributes the generated map update information.

Note that the update request area for which the navigation device 1 requests the map update information varies depending on the circumstances of the navigation device 1 when the navigation device 1 requests the map update information. Specifically, the navigation device 1 is constituted so as to request the distribution of map update information from the map distribution center 3 when the power is turned on and when a destination is set and route guidance started. When the power of the navigation device 1 is turned on, the navigation device 1 requests the distribution of the map update information for a 2D mesh that includes an area of a predetermined square distance (e.g. 80 km$^2$) centered on a saved location in the navigation device 1 (e.g. the user's home), and a 2D mesh that includes all national high-standard roads (e.g. expressways and the like). When a destination is set and route guidance started by the navigation device 1, the navigation device 1 requests the distribution of the map update information for a 2D mesh that includes an area of a predetermined square distance (e.g. 10 km$^2$) centered on the destination set in the navigation device 1, a 2D mesh that includes the guidance route, and a 2D mesh that includes all national high-standard roads.

The center side communication device 29 serves as a communication device for communicating with the navigation device 1 via a network 8. Here, a communication system such as a LAN (Local Area Network), a WAN (Wide Area Network), an intranet, a cellular telephone network, a telephone network, a public communication network, a private communication network, the Internet, or another communication network, for example, may be used as the network 8. A communication system employing satellite CS broadcasting, BS broadcasting, digital terrestrial broadcasting, FM multiplex broadcasting, and so on may also be used. Furthermore, a communication system used in an intelligent transport system (ITS), such as an electric toll collection (ETC) and dedicated short range communications (DSRC), may also be used.

Figure 3:
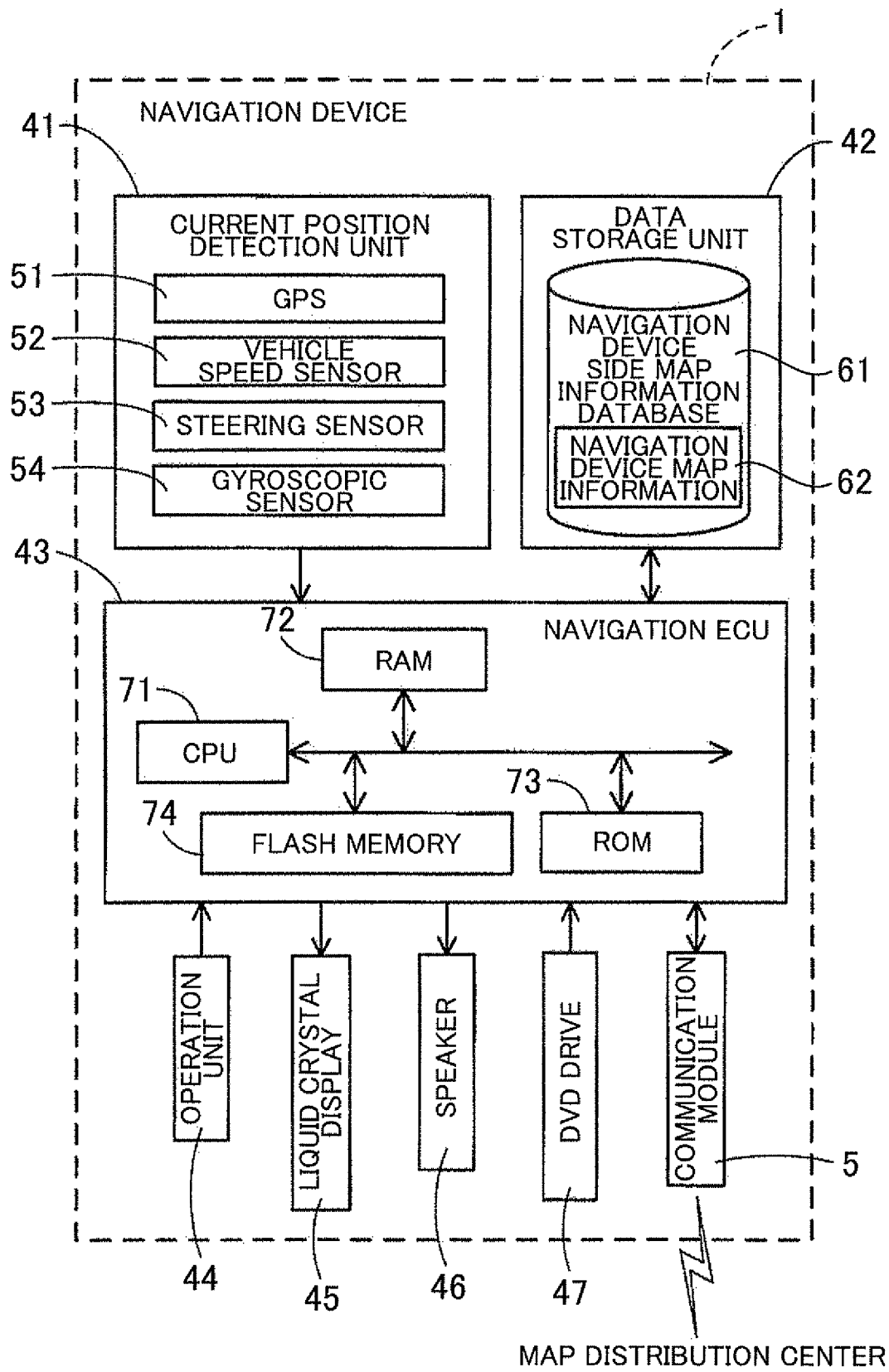
FIG. 3 is a block diagram that shows the structure of a navigation device according to the example.

Next, an overall configuration of the navigation device 1 according to the present example will be described using FIG. 3. FIG. 3 is a block diagram that shows the navigation device 1 according to the present example.

As shown in FIG. 3, the navigation device 1 according to the present example is constituted by a current position detection unit 41 that detects a current vehicle position, a data storage unit 42 that stores various data, a controller (e.g., navigation ECU 43) that performs various computational processing based on input information, an operation unit 44 that accepts an operation from the user, a liquid crystal display 45 that displays a map and the like for the user, a speaker 46 that outputs voice guidance related to route guidance, a DVD drive 47 that reads a DVD serving as a storage medium that stores programs, and the communication module 5 described earlier that performs communication with an information center such as the map distribution center 3.

Each of the configuring elements of the navigation device 1 will be explained in order below.

The current position detection unit 41 includes a GPS 51, a vehicle speed sensor 52, a steering sensor 53, a gyroscopic sensor 54, an altimeter (not shown in the drawing), and the like, and is capable of detecting the vehicle's current position, heading, running speed, and the like. The vehicle speed sensor 52, in particular, is a sensor for detecting the vehicle's speed and distance traveled. The vehicle speed sensor 52 generates a pulse in response to the rotation of the vehicle's wheels and outputs a pulse signal to the navigation ECU 43. The navigation ECU 43 counts the generated pulses to compute the revolution speed of the wheels and the distance traveled. Note that it is not necessary for the navigation device 1 to be provided with all of the five types of sensors described above, and it is acceptable for the navigation device 1 to be provided with only one or a plurality among the five types of sensors.

The data storage unit 42 includes a hard disk (not shown in the drawing) serving as an external storage device and recording medium, and a read/write head (not shown in the drawing) serving as a drive for reading a navigation device side map information database 61, predetermined programs, and so on from the hard disk and writing predetermined data to the hard disk.

The navigation device side map information database 61 stores navigation map information 62, which is used by the navigation device 1 for travel guidance and route searches.

The navigation map information 62 is constituted from various types of information required for route guidance, traffic information guidance, and map display, similar to the basic map information 30 described earlier.

The navigation map information 62 is updated by either a full update, in which the map information for all areas of the entire country is updated together, or a differential update, in which only the map information for a specific area is updated.

The navigation ECU 43 is an electronic control unit that performs overall control of the navigation device 1, including: a scheduled driving route setting process that, when a destination is selected, sets a scheduled driving route from the current position to the destination; a map information update process that updates the navigation map information 62 based on the map update information distributed from the map distribution center 3; and a travel guidance process that displays a map of the periphery of the vehicle position on the basis of the stored navigation map information 62 and the guidance information received from the map distribution center 3, and performs a route search and route guidance to the set destination. The navigation ECU 43 has a CPU 71 serving as a computational device and a control device, a RAM 72 which is used as a working memory when the CPU 71 performs various types of computational processing, and also stores route data and the like when a route has been found, a ROM 73 storing control programs as well as a guidance processing program (see FIGS. 6 and 7), and an internal storage device such as a flash memory 74 for storing programs read from the ROM 73.

The operation unit 44 is operated at times such as when a place of departure is input as a travel start point and a destination is input as a travel end point, and includes a plurality of operation switches (not shown in the drawing), such as various types of keys, buttons, and the like. Based on switch signals that are output by operating the various operation switches, such as by pressing or the like, the navigation ECU 43 controls the various types of corresponding operations that are executed. Note that the operation unit 44 can also be configured as a touch panel that is provided on the front surface of the liquid crystal display 45.

The liquid crystal display 45 displays a map image that includes roads, traffic information, operation guidance, an operation menu, key guidance, a scheduled driving route from the place of departure to the destination, guidance information along the scheduled driving route, news, a weather forecast, the time, e-mail, a television program, and the like.

The speaker 46 outputs traffic information guidance and voice guidance for guiding travel along the scheduled driving route on the basis of an instruction from the navigation ECU 43.

The DVD drive 47 is a drive capable of reading data recorded on a recording medium such as a DVD or a CD. The navigation device side map information database 61 is updated and the like based on the data that is read.

Figure 4:
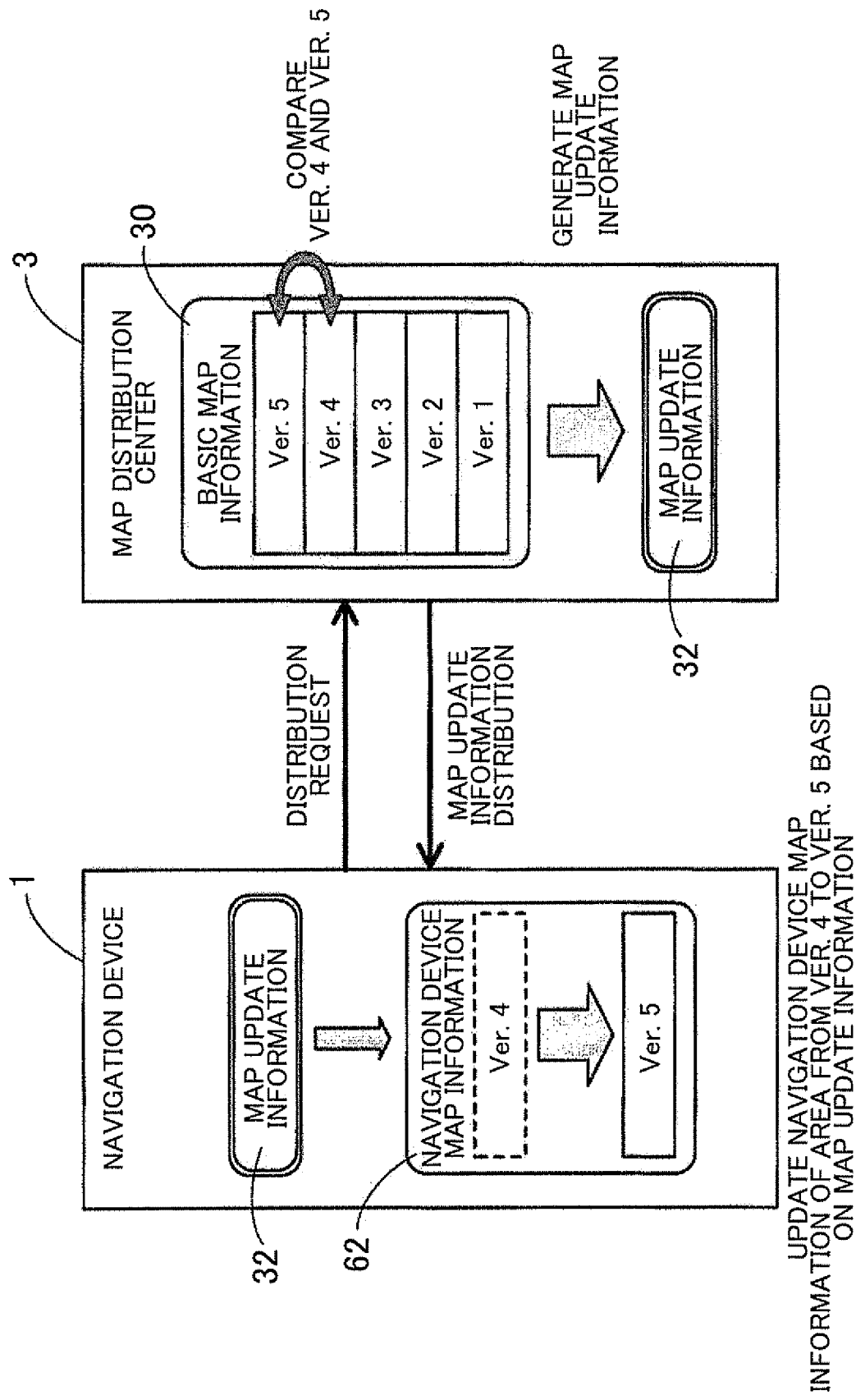
FIG. 4 is an explanatory drawing of a difference update of map information stored in the navigation device.

A brief example of updating the navigation map information 62 stored in the navigation device 1 will be explained next using FIG. 4. In the example shown in FIG. 4, a distribution request for map update information in order to update the map information of a predetermined update request area has been transmitted from the navigation device 1 to the map distribution center 3. The version of the update request area in the navigation map information 62 stored in the navigation device 1 is 4. Meanwhile, the latest version of the update request area in the basic map information 30 of the map distribution center 3 is 5.

In this case, the map distribution center 3 generates the map update information 32 by comparing the versions 4 and 5 of the basic map information 30 stored in the center side map information database 26. Note that the map update information 32 generated in such case is data that, among the navigation map information 62 stored in the navigation device 1, updates the map information of the update request area from version 4 to version 5. When generating the map update information, a process (network confirmation process) that confirms whether the road network after updating is correctly connected between the area whose map information was updated and adjacent areas, and a process (error check process) that checks for errors in the generated map update information are also performed.

The map distribution center 3 then distributes the generated map update information 32 to the navigation device 1 that originated the distribution request. The navigation device 1 that received the map update information 32 updates the navigation map information 62 using the received map update information 32. Consequently, among the navigation map information 62 stored in the navigation device 1, the map information of the update request area is updated from version 4 to version 5.

Travel guidance in the vehicle 4 that is performed using the liquid crystal display 45 and the speaker 46 of the navigation device 1 will be briefly explained next using FIG. 5.

Here, as the above travel guidance, the navigation device 1 according to the present example is provided with a first guidance that uses the navigation map information 62 stored in the navigation device 1, and a second guidance that uses the guidance information transmitted from the map distribution center 3. The navigation ECU 43 selects which of the first guidance and the second guidance will be used as the travel guidance for the vehicle 4 based on an update status of the navigation map information 62 as described later.

Figure 5:
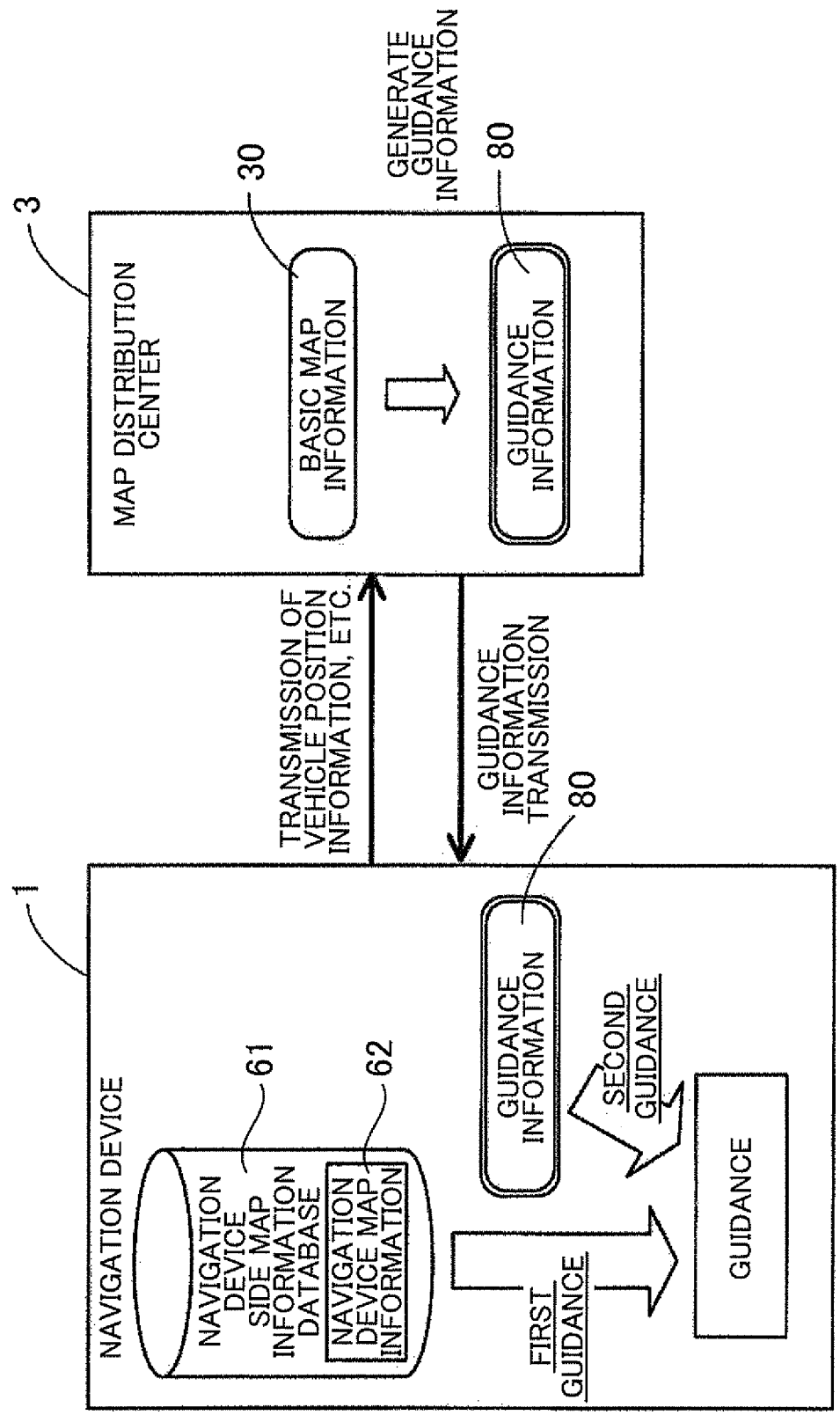
FIG. 5 is an explanatory drawing of vehicle travel guidance by the navigation device.

According to the first guidance, the guidance image and voice guidance are generated based on the navigation map information 62 stored in the navigation device side map information database 61, as shown in FIG. 5, to display a map of the vehicle periphery and perform travel guidance to the set destination.

According to the second guidance, a current position of the vehicle 4, an execution range of the second guidance (specifically, a guidance switch point E described later), and the like are transmitted from the navigation device 1 to the map distribution center 3. In response, the map distribution center 3 uses the latest version of the basic map information 30 to collectively generate a guidance image and voice guidance to be output by the navigation device 1 as guidance information 80 within the execution range of the second guidance, and transmits the guidance information 80 to the navigation device 1 that originated the initial transmission. The navigation device 1 then performs travel guidance in the execution range of the second guidance by outputting the guidance image and voice guidance included in the received guidance information 80 from the liquid crystal display 45 and the speaker 46. In other words, according to the second guidance, the navigation device 1 performs guidance based on the basic map information 30 instead of the navigation information 62. Therefore, even if the navigation map information 62 is not updated to the latest map version, guidance based on the latest map version can be performed in the navigation device 1.

Figure 6:
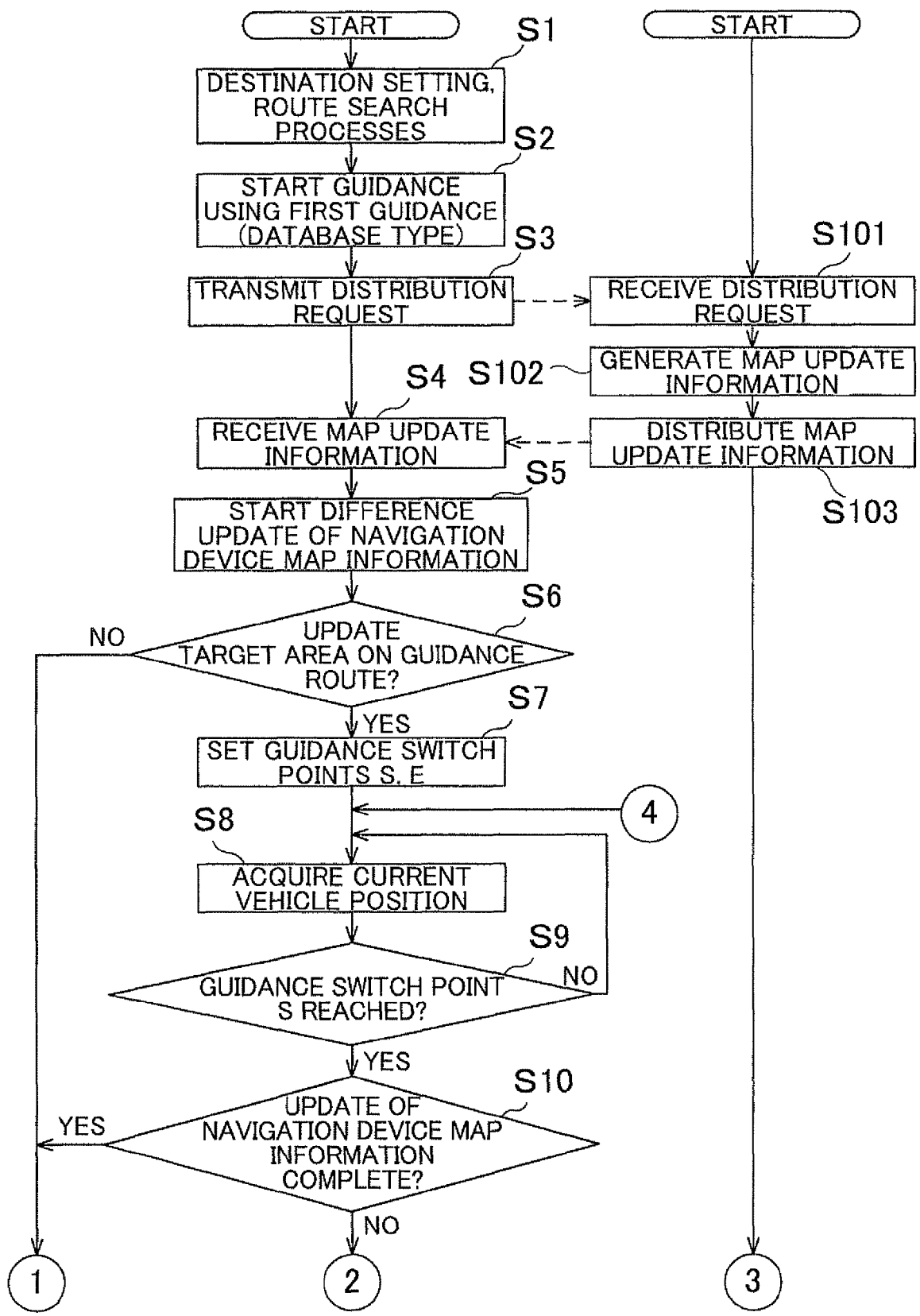
FIG. 6 is a flowchart of a guidance processing method according to the example.
Figure 7:
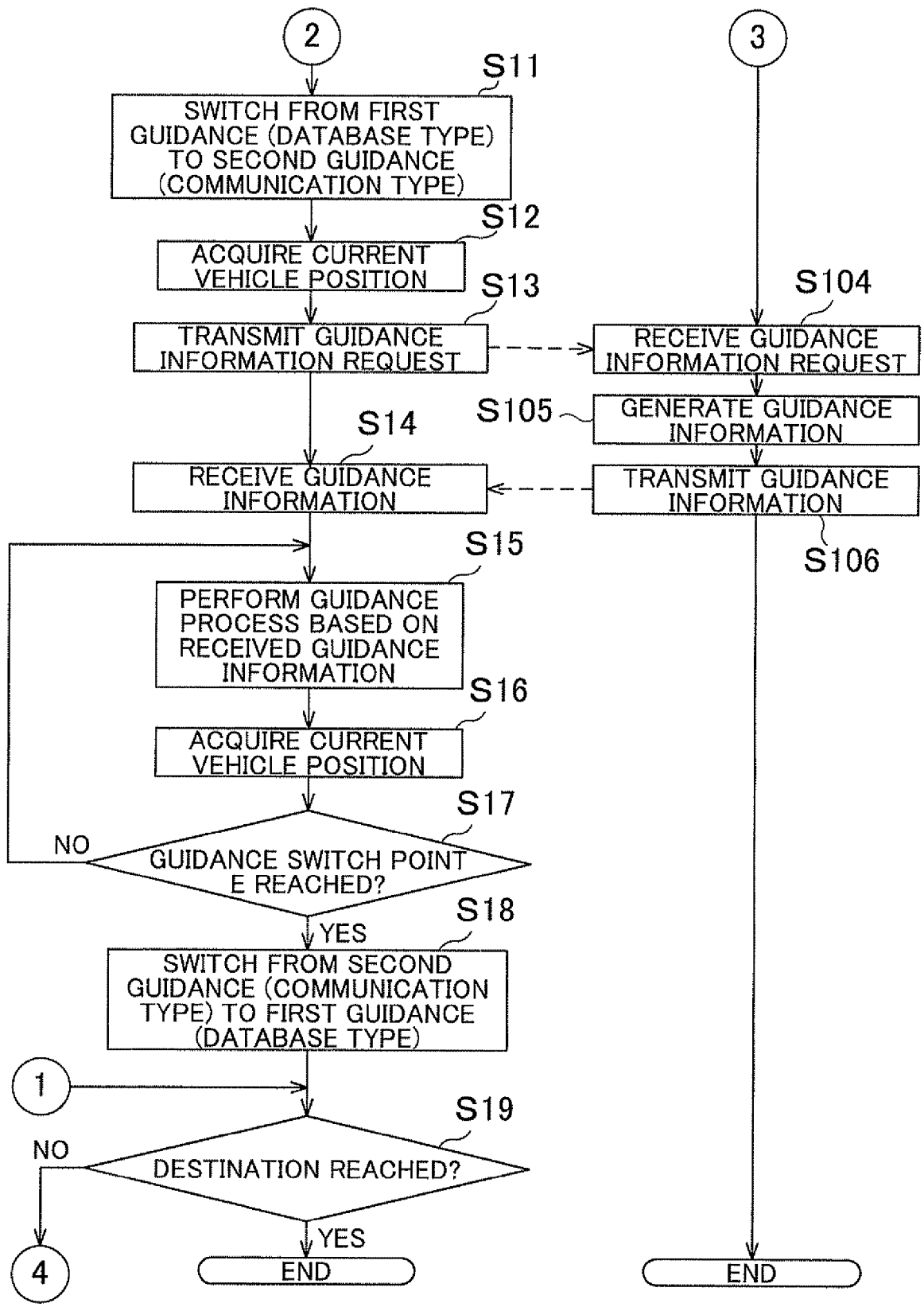
FIG. 7 is a flowchart of the guidance processing method according to the example.

Next, an exemplary guidance processing method will be described with respect to the algorithm shown in FIGS. 6 and 7. The exemplary method may be implemented, for example, by one or more components of the above-described system 2. For example, the exemplary algorithm may be implemented as one or more computer programs stored in the RAM 72 or ROM 73 of the navigation ECU 43 or the RAM 22 or ROM 23 of the server 20. The program(s) may be executed in whole or in part by the CPU 71 or the CPU 21. However, even though the exemplary structure of the above-described system 2 may be referenced in the description, it should be appreciated that the structure is exemplary and the exemplary process need not be limited by any of the above-described exemplary structure.

Here, the map guidance processing program is executed when the user performs an operation to set a destination. The map guidance processing program performs differential updating of the navigation map information 62 stored in the navigation device 1. In addition, the map guidance processing program displays a map of the vehicle periphery and performs travel guidance to the set destination based on either the first guidance or the second guidance.

In the guidance processing program, at step (hereinafter abbreviated as "S") 1, the CPU 71 of the navigation device 1 sets the destination based on a destination setting operation of the user that was received. At S1, the CPU 71 further searches for a route from the place of departure (e.g. the current vehicle position) to the set destination. Based on the route search result, the CPU 71 sets the optimum guidance route (i.e., the scheduled driving route). Note that the route search process is performed using the Dijkstra method or other known method.

At S2, with the start of travel by the vehicle 4, the CPU 71 subsequently starts the first guidance, wherein vehicle travel guidance is performed using the navigation map information 62 stored in the navigation device 1. Specifically, according to the first guidance, a guidance image and voice guidance are generated based on the navigation map information 62 stored in the navigation device side map information database 61 to display a map of the vehicle periphery and perform travel guidance based on the set guidance route.

Next, at S3, the CPU 71 transmits a distribution request for map update information to the map distribution center 3. Note that the distribution request includes the user ID identifying the navigation device 1 that transmitted the distribution request, and information identifying the area for which an update is requested (the update request area). The area for which an update is requested may be, for example, a 2D mesh that includes an area of a predetermined square distance (e.g. 10 km²) centered on the destination set in the navigation device 1, a 2D mesh that includes the guidance route, or a 2D mesh that includes all national high-standard roads.

Meanwhile, at S101, the CPU 21 of the map distribution center 3 receives the distribution request transmitted from the navigation device 1, and stores information pertaining to the received distribution request in the RAM 22.

At S102, the CPU 21 generates the map update information for updating the map information of the update request area, and temporarily stores the map update information in the map update information storage database 28.

Note that the map update information generated at S102 is data that updates a 2D mesh (referred to hereafter as an update target area), for which a version of map information older than the latest version is stored in the navigation device 1 that originated the distribution request, from the current version to the latest version. When generating the map update information at S102, similar to related art, a process (network confirmation process) that confirms whether the road network after updating is correctly connected between the area whose map information was updated and adjacent areas, and a process (error check process) that checks for errors in the generated map update information are also performed. Further note that the generation method of the map update information is already known and therefore not explained here.

Next, at S103, the CPU 21 distributes the map update information generated at S102 to the navigation device 1 that originated the distribution request.

At S4, the CPU 71 of the navigation device 1 receives the map update information distributed from the map distribution center 3, and starts the update process of the navigation map information 62 using the received map update information. Specifically, processing is performed to identify the update target area, and overwrite the map information of the 2D mesh within the update target area (link data, node data, POT data, and the like) to the latest version of the map information in the basic map information 30. Note that, once the process is complete, the map information of the update target area (i.e., the update request area) among the navigation map information 62 stored in the navigation device 1 is updated to the latest version of the map information.

Next, at S6, the CPU 71 determines whether there is an update target area subject to updating based on the map update information received at S4 on the guidance route set at S1 (determines whether the vehicle 4 will pass through an update target area).

If it is determined that there is an update target area on the guidance route (S6: YES), the processing proceeds to S7. However, if it is determined that there is no update target area on the guidance route (S6: NO), the processing proceeds to S19.

At S7, the CPU 71 specifies map image display range 83 based on a display state (e.g. a map display scale or the like) of a map of the vehicle periphery currently set in the navigation device 1, and sets guidance switch points S and E on the guidance route based on the specified display range 83. The guidance switch point S is a point where the travel guidance of the vehicle 4 executed in the navigation device 1 is switched from the first guidance to the second guidance. The guidance switch point E is a point where the travel guidance of the vehicle 4 executed in the navigation device 1 is switched from the second guidance to the first guidance.

A setting process of the guidance switch points S and E will be described in detail below using the drawings.

Figure 8:
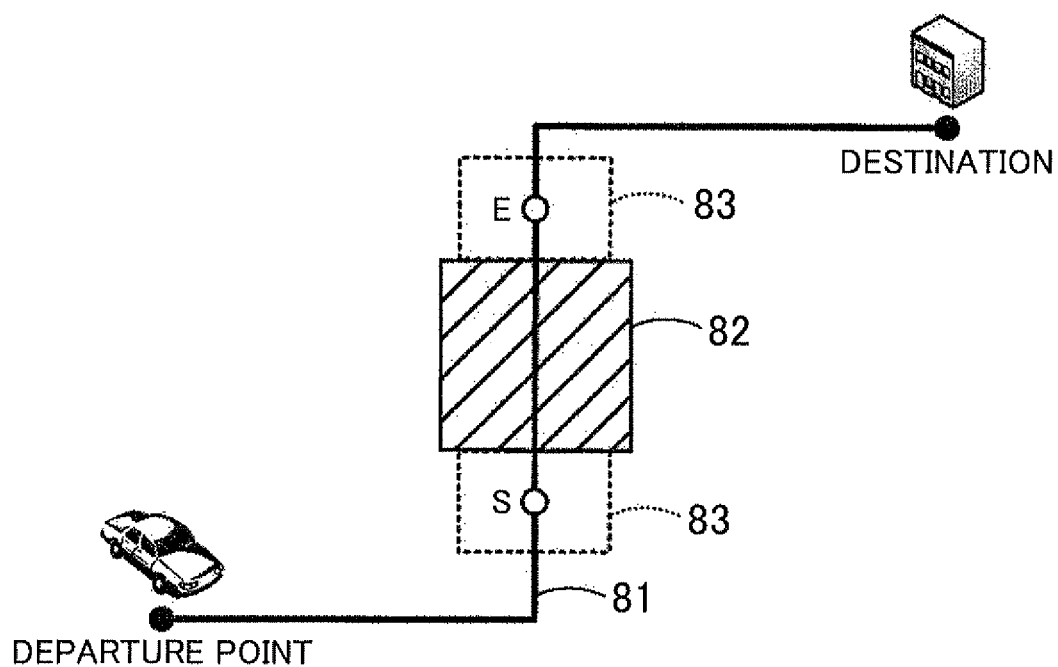
FIG. 8 is an explanatory drawing of a setting process of guidance switch points S and E.

FIG. 8 shows an example in which a guidance route 81 is set from the place of departure to the destination and there is an update target area 82 on the guidance route 81. In this case, the locations of the guidance switch points S and E are set based on the map image display range 83 specified from the display state (e.g. the map display scale or the like) of the map of the vehicle periphery currently set in the navigation device 1. The navigation device 1 displays a map image of the vehicle periphery on the liquid crystal display 45 at a preset scale setting. In other words, the map image display range 83 varies depending on the set scale.

As the guidance switch point S, the CPU 71 sets a location of the vehicle 4 which is before the vehicle 4 reaches the update target area 82 while traveling on the guidance route 81 and which is farthest from the place of departure, excluding the update target area 82, in the map image display range 83 displayed at the set scale on the liquid crystal display 45.

As the guidance switch point E, the CPU 71 sets a location of the vehicle 4 which is after the vehicle 4 passes through the update target area 82 while traveling on the guidance route 81 and which is nearest the place of departure, excluding the update target area 82, in the map image display range 83 displayed at the set scale on the liquid crystal display 45.

Thus, immediately before guidance is provided to the user regarding information pertaining to an update target area not yet updated, as described later, the guidance technique can be switched to the second guidance (the communication type navigation system). Further, the guidance technique can be switched to the usual first guidance (guidance using the navigation map information 62) immediately after it is no longer necessary to provide guidance to the user regarding information pertaining to the update target area. In other words, it is possible to set only segments where guidance can be performed based on the new version of the map information by switching to the communication type navigation system as segments where guidance is performed based on the communication type navigation system.

Figure 9:
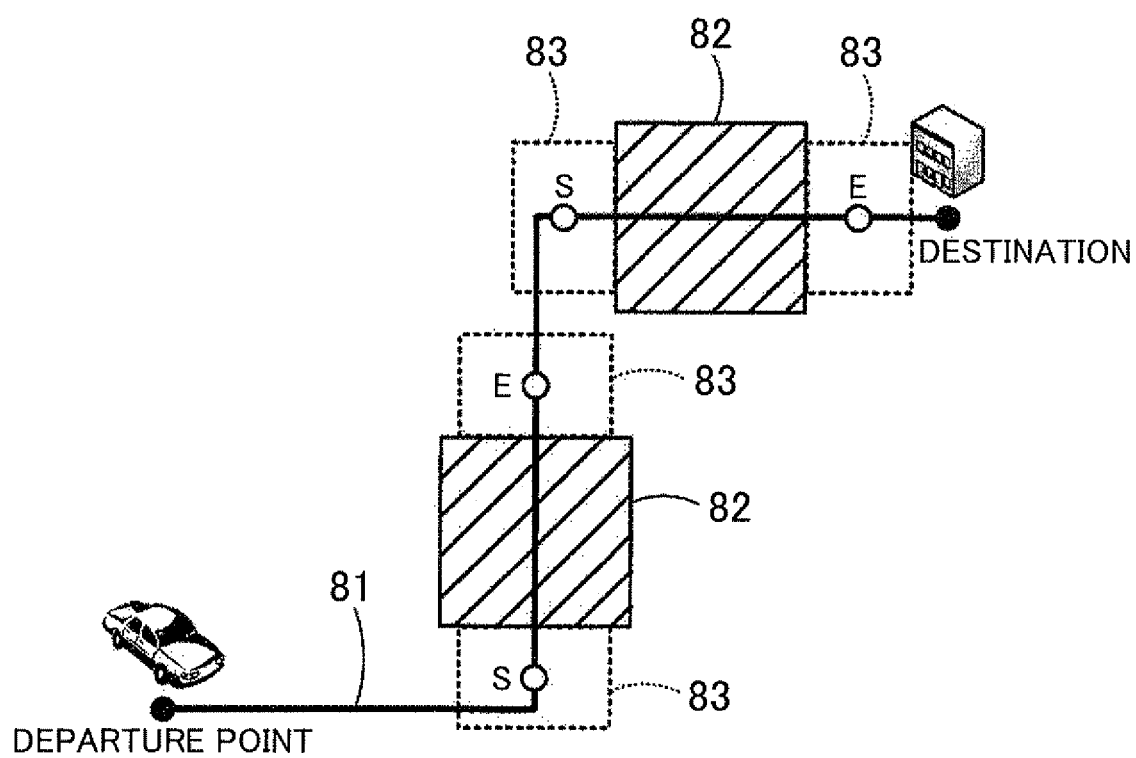
FIG. 9 is an explanatory drawing of the setting process of guidance switch points S and E when there is a plurality of update target areas.

Note that when there are a plurality of update target areas 82 as shown in FIG. 9, the guidance switch points S and E are set for each update target area. After the guidance switch points S and E are set, the position coordinates of the guidance switch points S and E are associated with the update target area 82 and stored in the RAM 72 or the like.

Further note that FIGS. 8 and 9 show the guidance switch points S and E that are set when the display mode set in the navigation device 1 displays the map of the vehicle periphery as viewed from directly above, with the vehicle position located at the screen center of the liquid crystal display 45. The map image display range 83 thus changes, for example, if a display mode that displays the vehicle position at a location other than the screen center, or a display mode that displays a bird's eye view is set. Consequently, the guidance switch points S and E are also set to different positions in such cases.

At S8, the CPU 71 acquires the current position of the vehicle 4 based on the detection result of the current position detection unit 41.

Next, based on the current position of the vehicle 4 acquired at S8 and the position coordinates of the set guidance switch point S set at S7, it is determined whether the vehicle 4 has reached the guidance switch point S.

If it is determined that the vehicle 4 has reached the guidance switch point S (S9: YES), the processing proceeds to S10. However, if it is determined that the vehicle 4 has not reached the guidance switch point S (S9: NO), the processing returns to S8.

At S10, the CPU 71 determines whether the update of the navigation map information 62 based on the received map update information is complete. Note that, if there is a plurality of update target areas, it is determined whether the update of the update target area associated with the guidance switch point S determined as reached at S9 is complete.

If it is determined that the update of the navigation map information 62 based on the received map update information is complete (S10: YES), the processing proceeds to S19. However, if it is determined that the update of the navigation map information 62 based on the received map update information is not complete (S10: NO), the processing proceeds to S11.

At S11, the CPU 71 switches from the first guidance to the second guidance, wherein guidance is performed using the guidance information transmitted from the map distribution center 3.

When performing the second guidance, first, at S12, the CPU 71 acquires the current position of the vehicle 4 based on the detection result of the current position detection unit 41.

At S13, the CPU 71 subsequently transmits to the map distribution center 3 a guidance information request that includes information pertaining to the current vehicle position acquired at S12 and information on the guidance switch point E set at S7. The CPU 21 of the map distribution center 3 receives the guidance information request at S104, and in response, generates a guidance image and voice guidance to be output by the navigation device 1 as guidance information (S105), and transmits the guidance information to the navigation device 1 that originated the initial transmission (S106). Here, the CPU 21 performs a route search from the current position of the vehicle 4 to the guidance switch point E using the latest version of the basic map information 30 when generating the guidance information. The CPU 21 then generates the guidance information based on the result of the route search. Accordingly, the guidance information generated may provide guidance for a route different from the guidance route set in the navigation device 1.

The navigation device 1 that received the guidance information at S14 subsequently performs travel guidance by displaying the guidance image on the liquid crystal display 45 and outputting the voice guidance from the speaker 46, which were included in the received guidance information (S15).

At S16, the CPU 71 acquires the current position of the vehicle 4 based on the detection result of the current position detection unit 41.

Next, based on the current position of the vehicle 4 acquired at S16 and the position coordinates of the set guidance switch point E set at S7, it is determined whether the vehicle 4 has reached the guidance switch point E.

If it is determined that the vehicle 4 has reached the guidance switch point E (S17: YES), the processing proceeds to S18. However, if it is determined that the vehicle 4 has not reached the guidance switch point E (S17: NO), the processing returns to S15 and the second guidance is continued.

At S18, the CPU 71 switches from the second guidance to the first guidance, wherein vehicle travel guidance is performed using the navigation map information 62 stored in the navigation device 1.

At S19, the CPU 71 determines whether the vehicle 4 has reached the destination. If it is determined that the vehicle 4 has reached the destination (S19: YES), the guidance processing program is ended. However, if it is determined that the vehicle 4 has not reached the destination (S19: NO), the processing returns to S8 and the guidance processing based on the guidance route is continued.

As described in detail above, in the navigation device 1, the map information guidance method used by the navigation device 1, and the computer program executed by the navigation device 1 according to the present example, if a destination is set in the navigation device 1, a differential update of the navigation map information stored in the navigation device 1 is started (S5). The guidance switch points S and E are set if there is an update target area on the guidance route (S7). In addition, if the update process for the update target area of the navigation map information 62 is not complete when the vehicle 4 reaches the guidance switch point S, the guidance technique is switched from the first guidance that uses the navigation map information 62 stored in the navigation device 1 to the second guidance that uses the guidance information transmitted from the map distribution center 3. When the vehicle 4 reaches the guidance switch point E thereafter, the guidance technique is again switched back from the second guidance to the first guidance. Thus, guidance can be switched to the second guidance that uses the guidance information created by the map information center 3 under necessary circumstances while performing the first guidance that uses the navigation map information 62 stored in the navigation device side map information database 61. As a consequence, the volume of communication between the navigation device 1 and the map distribution center 3 can be suppressed, and suitable guidance can be performed based on new map information without worsening the response of the guidance process.

The locations of the guidance switch points S and E are set based on the map scale currently set in the navigation device 1. Therefore, switch points for switching the guidance can be set in consideration of the range for which guidance is provided on the liquid crystal display 45 based on the display state of the map of the vehicle periphery set in the navigation device 1. Accordingly, maps can be smoothly displayed even when guidance is switched between the first guidance that uses the navigation map information 62 stored in the navigation device side map information database 61 and the second guidance that uses the guidance information created by the map information center 3.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, a cellular telephone, PDA, personal computer, or the like may be used in place of the navigation device 1.

In addition, according to the present example, if there is a plurality of update target areas at S10, it is determined whether the update of the update target area associated with the guidance switch point S determined as reached at S9 is complete. However, it may be determined instead whether the updates of all the update target areas are complete.

The present example uses a 2D mesh as the unit of the update target area, but links and nodes may also be used as the units of the update target area.

The present example is configured such that, once the second guidance is started, the guidance information required for the second guidance is collectively transmitted thereafter from the map distribution center 3 to the navigation device 1. However, the required guidance information may be periodically transmitted from the map distribution center 3 to the navigation device 1 during execution of the second guidance.

Specifically, once the second guidance is started, information on the current position of the vehicle 4 is periodically transmitted from the navigation device 1 to the map distribution center 3. The map distribution center 3 then generates a guidance image and voice guidance as guidance information for providing guidance on a surrounding area that includes the current position of the vehicle 4 for which the current position information was received, and transmits the guidance information to the navigation device 1 that originated the initial transmission. The navigation device 1 that receives the guidance information then displays a map of the vehicle periphery and performs travel guidance by outputting the guidance image and voice guidance included in the received guidance information from the liquid crystal display 45 and the speaker 46.

When performing the route search process at S1, a configuration may be used in which both the vehicle time of arrival at the update target area and the completion time of the map update of the navigation map information 62 are estimated; the two times are then compared, and the guidance switch points S and E are only set if the vehicle time of arrival at the update target area is longer than the completion time of the map update of the navigation map information 62.

According to the present example, at S7, the CPU 71 is configured so as to specify the map image display range 83 as the display state of the periphery map of the navigation device 1 based on the scale set in the navigation device 1, and set the guidance switch points S and E accordingly (FIGS. 8 and 9). However, the CPU 71 may be configured so as to specify the map image display range 83 based on the display state of a periphery map of another navigation device 1, and set the guidance switch points S and E accordingly. Note that, as the display state, in addition to a display state that displays the map of the vehicle periphery as viewed from directly above with the vehicle position located at the screen center of the liquid crystal display 45, a display mode that displays a bird's eye view as viewed obliquely upward or a display mode that divides the screen into two screens may also be used.

According to the present example, at S13, the CPU 71 transmits to the map distribution center 3 a guidance information request that includes information pertaining to the current vehicle position and information on the guidance switch point E set at S7. However, the CPU 71 may be configured so as to transmit information on the guidance switch point S in place of the current vehicle position. Specifically, at S9, the CPU 71 determines whether the vehicle has reached a point that is a predetermined distance before the guidance switch point S. If it is determined that the vehicle has reached the point that is a predetermined distance before the guidance switch point S, the CPU 71 transmits to the map distribution center 3 a guidance information request that includes information on the guidance switch points S and E. The map distribution center 3 that receives the guidance information request is configured so as to generate a guidance image and voice guidance to be output by the navigation device 1 when the vehicle travels from the guidance switch point S to E as guidance information, and transmit the guidance information to the navigation device 1.

What is claimed is:

1. A map information guidance device for installation in a vehicle, the map information guidance device comprising:
    a data storage unit that stores map information; and
    a controller configured to:
        update the map information stored in the map information storage medium, based on map update information distributed from a map distribution center;
        search for a route to a destination based on the stored map information;
        perform a first guidance along the route;
        identify an update target area on the route that will be updated when the map information is updated;
        prior to the vehicle reaching the update target area, determine whether the update of the update target area will be complete when the vehicle reaches the update target area; and
        if the update of the update target area will not be complete when the vehicle reaches the update target area:
            request second guidance for the update target area from the map distribution center;
            switch from proving the first guidance to providing the second guidance through the update target area; and
            return to performing the first guidance when the vehicle has exited the update target area.

2. The map information guidance device according to claim 1, wherein the controller is configured to:
    perform guidance by displaying a map of a periphery of the vehicle in a set display state on an image display device;

set a switch point at which the first guidance is switched to the second guidance based on the set display state; and switch from the first guidance to the second guidance when the vehicle reaches the set switch point.

3. The map information guidance device according to claim 1, wherein the controller is configured to:

perform guidance by displaying a map of a periphery of the vehicle in a set display state on an image display device;

set a switch point at which to return to performing the first guidance based on the set display state; and switch from the second guidance to the first guidance when the vehicle reaches the set switch point.

4. The map information guidance device according to claim 3, wherein:

the controller is configured to:

set another switch point at which the first guidance is switched to the second guidance based on the set display state; and switch from the first guidance to the second guidance when the vehicle reaches the other set switch point; and when the controller requests second guidance for the update area from the map distribution center, the controller transmits to the map distribution center:

either the current vehicle position or the other switch point; and the switch point.

5. The map information guidance device according to claim 1, further comprising a communication module for communicating with the map distribution center.

6. The map information guidance device according to claim 1, further comprising an image display device for displaying the first guidance and the second guidance.

7. The map information guidance device according to claim 1, wherein the distributed map update information is differential map update information.

8. The map information guidance device according to claim 1, wherein the update target area is defined as a two-dimensional mesh.

9. The map information guidance device according to claim 1, wherein the controller is configured to:

estimate a time at which the update of the update target area will be complete;

estimate a time at which the vehicle will reach the update target area; and determine that the update of the update target area is complete when the estimated time at which the vehicle will reach the update target area is after the estimated time at which the update of the target area will be complete.

10. A navigation device comprising the map information guidance device according to claim 1.

11. A map information guidance method for a vehicle, the method comprising:

receiving map update information distributed from a map distribution center;

updating map information stored in a map information storage medium of a map information guidance device based on the received map update information;

searching for a route to a destination based on the stored map information;

performing a first guidance along the route;

identifying an update target area on the route that will be updated when the map information is updated;

prior to the vehicle reaching the update target area, determining whether the update of the update target area will be complete when the vehicle reaches the update target area; and if the update of the update target area will not be complete when the vehicle reaches the update target area:

requesting second guidance for the update target area from the map distribution center;

switching from proving the first guidance to providing the second guidance through the update target area; and returning to performing the first guidance when the vehicle has exited the update target area.

12. The map information guidance method according to claim 11, further comprising:

performing guidance by displaying a map of a periphery of the vehicle in a set display state on an image display device;

setting a switch point at which the first guidance is switched to the second guidance based on the set display state; and switching from the first guidance to the second guidance when the vehicle reaches the set switch point.

13. The map information guidance method according to claim 11, further comprising:

performing guidance by displaying a map of a periphery of the vehicle in a set display state on an image display device;

setting a switch point at which to return to performing the first guidance based on the set display state; and switching from the second guidance to the first guidance when the vehicle reaches the set switch point.

14. The map information guidance method according to claim 13, further comprising:

setting another switch point at which the first guidance is switched to the second guidance based on the set display state; and switching from the first guidance to the second guidance when the vehicle reaches the other set switch point;

wherein, requesting second guidance for the update area from the map distribution center comprises transmitting to the map distribution center:

either the current vehicle position or the other switch point; and the switch point.

15. The map information guidance method according to claim 11, further displaying the first guidance and the second guidance on an image display device in the map information guidance device.

16. The map information guidance method according to claim 11, further comprising communicating with the map distribution center via a communication module in the map information guidance device.

17. The map information guidance method according to claim 11, wherein the distributed map update information is differential map update information.

18. The map information guidance method according to claim 11, wherein the update target area is defined as a two-dimensional mesh.

19. The map information guidance method according to claim 11, further comprising:

estimating a time at which the update of the update target area will be complete;

estimating a time at which the vehicle will reach the update target area; and determining that the update of the update target area is complete when the estimated time at which the vehicle will reach the update target area is after the estimated time at which the update of the target area will be complete.

20. A non-transitory computer-readable storage medium storing a computer-executable program for providing map information guidance for a vehicle, the program comprising:
- instructions for receiving map update information distributed from a map distribution center;
- instructions for updating map information stored in a map information storage medium of a map information guidance device based on the received map update information;
- instructions for searching for a route to a destination based on the stored map information;
- instructions for performing a first guidance along the route;
- instructions for identifying an update target area on the route that will be updated when the map information is updated;
- instructions for determining, prior to the vehicle reaching the update target area, whether the update of the update target area will be complete when the vehicle reaches the update target area; and
- instructions for, if the update of the update target area will not be complete when the vehicle reaches the update target area:
  - requesting second guidance for the update area from the map distribution center;
  - switching from proving the first guidance to providing the second guidance through the update target area; and
- returning to performing the first guidance when the vehicle has exited the update target area.

* * * * *